(No Model.)
A. O. FRICK.
STEERING GEAR FOR ROAD ENGINES.
No. 243,880. Patented July 5, 1881.
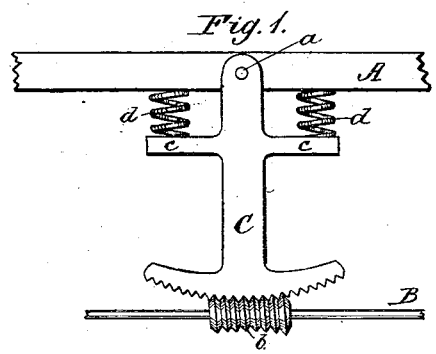
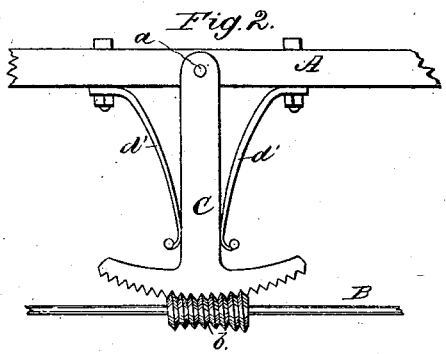
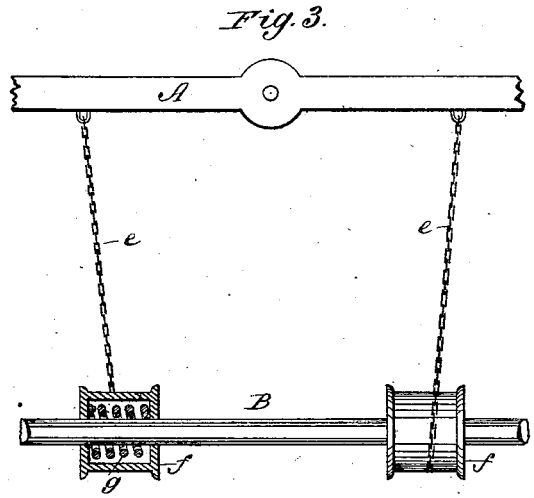
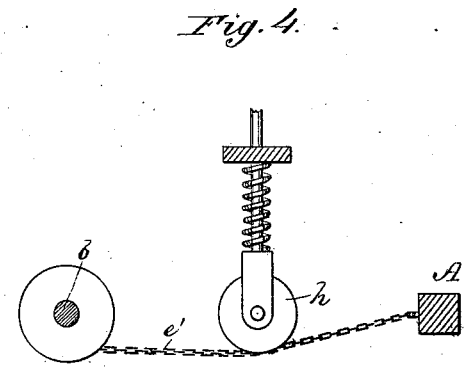
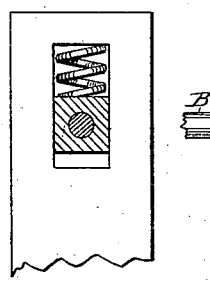
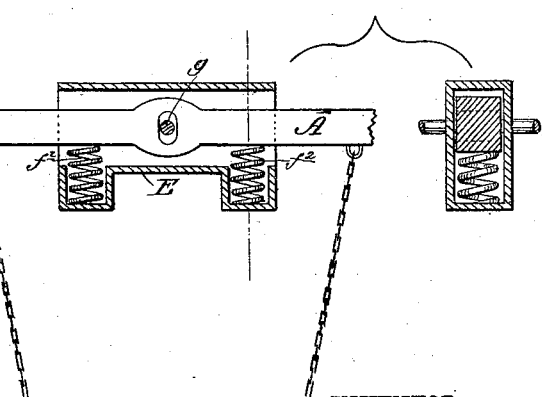
WITNESSES:
W. W. Hollingsworth
Edw. W. Byrn
INVENTOR:
A. O. Frick
BY
ATTORNEYS.

UNITED STATES PATENT OFFICE.

ABRAHAM O. FRICK, OF WAYNESBOROUGH, PENNSYLVANIA.

STEERING-GEAR FOR ROAD-ENGINES.

SPECIFICATION forming part of Letters Patent No. 243,880, dated July 5, 1881.

Application filed April 28, 1881. (No model.)

*To all whom it may concern:*

Be it known that I, ABRAHAM O. FRICK, of Waynesborough, in the county of Franklin and State of Pennsylvania, have invented a new and Improved Steering-Gear for Road-Engines and other Vehicles; and I do hereby declare that the following is a full, clear, and exact description of the same, reference being had to the accompanying drawings, forming part of this specification, in which—

Figures 1, 2, and 3 are plan views of three different forms of my invention. Fig. 4 is a side view with the axle and drum-shaft in section, showing another modification. Fig. 5 are sectional views of a spring-seated bearing for the drum-shaft. Fig. 6 are sectional views of another modification of the invention.

The usual mode of steering road-engines and other analogous vehicles is to arrange the front axle upon a vertical pivot and connect the axle on each side of its pivot with steering devices, which, by changing the angular position of the axle, cause the engine to turn in one direction or the other, as the case may be. When, however, such axle is connected to its steering-gear by an unyielding connection, certain difficulties are involved, as follows: If one of the wheels of this axle strikes a stone or other obstruction, the shock has a tendency to deflect the axle, and a violent strain is brought upon the connection of the steering-gear, which is likely to damage them if they are locked in position, and if they are not locked and the gear turns, it produces a permanent change in the position of the axle, and the engine runs out of its path.

My invention consists in combining the pivoted front axle and the positively-acting steering-gear shaft by a connection which makes the strain of the steering-gear on the axle an elastic one, and whereby, also, in the event of one of the wheels striking a stone or obstruction, the shock is taken up and not allowed to injuriously affect the steering-gear, and the axle is immediately restored to its former true position for running in a straight line after it passes such obstruction.

In carrying out my invention I may employ a variety of means, all showing modified forms of the same general invention, and all producing the same result.

In Fig. 1, A is the front axle, pivoted upon a vertical bolt at $a$, and B is the steering-gear shaft, which has a worm, $b$, that gears with a threaded segment or an anchor-shaped bar, C, hung to the center about which the axle turns. Between the arms $c\ c$ of the bar and the axle are arranged two springs, $d\ d$, one on each side. This arrangement causes the turning-strain of the steering-shaft B on the axle to be an elastic one in either direction.

A second modification is shown in Fig. 2, in which leaf-springs $d'\ d'$ are bolted directly to the rear of the axle and bear at their ends against the central portion of the bar C.

In Fig. 3 the axle A is connected to the steering-shaft B by chains $e\ e$ and drums $f\ f$, the drums having an elastic connection with the steering-shaft through springs $g\ g$, located within the drums or to one side of the same, as may be preferred.

In Fig. 4 the axle A is connected to the steering-shaft B by a chain, $e'$, which does not yield in the direction of its length, but which is pressed upon sidewise by a spring-seated tension-pulley, $h$, so that when a strain is brought on the chain it transmits said strain in an elastic manner by drawing toward a straight line and pressing against the tension-pulley, which acts much after the manner of a belt-tightener.

Fig. 5 shows a modification in which the steering-shaft itself is arranged in movable bearings which are backed by springs.

Fig. 6 shows a form in which the front axle is made yielding against springs $f^2$, arranged in seats in a casting, E. This casting E is mounted upon a vertical pivot, as is the axle in the other cases, and the axle is slotted transversely and connected to the casting E by a bolt, $g^2$, passing through the slot in the axle. In this case the connection between the axle and the steering-gear is not yielding, but the axle itself is made yielding, and this secures the same result. This latter arrangement has an advantage over the others in that it not only yields to obstruction which may be struck by one of its wheels, but if the same obstruction strikes both wheels the axle yields integrally or bodily in the same direction, or laterally to the rear.

I am aware that the single steering-wheel of a velocipede has been provided with springs which tend to hold it in the normal plane for advance movement, and I therefore only claim the pivoted front axle of a road-engine as sustained upon two wheels when combined with the positively-acting steering-gear shaft of a road-engine by the devices described.

Having thus described my invention, what I claim as new is—

1. The combination of the pivoted front axle, A, of a road-engine, the positively-acting steering-gear shaft B, and devices, substantially as described, whereby the rotation of the shaft B is made to deflect the said axle with a yielding or non-positive movement, substantially as described.

2. In a road-engine or other vehicle, the combination, with its pivoted axle, of a steering-gear and a cushion or spring adapted to resist the deflection of the axle upon its pivot by its elasticity, and adapted to resist also, by its elasticity, the integral backward movement of the axle when striking obstructions, as described.

ABRAHAM O. FRICK.

Witnesses:
EDWD. W. BYRN,
CHAS. A. PETTIT.